(12) United States Patent
Onoe et al.

(10) Patent No.: US 12,343,706 B2
(45) Date of Patent: Jul. 1, 2025

(54) EXHAUST GAS PURIFICATION CATALYST

(71) Applicant: Cataler Corporation, Kakegawa (JP)

(72) Inventors: Ryota Onoe, Kakegawa (JP); Ryo Tasaki, Kakegawa (JP); Shunsuke Oishi, Kakegawa (JP); Koki Aono, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 390 days.

(21) Appl. No.: 17/788,531

(22) PCT Filed: Dec. 7, 2020

(86) PCT No.: PCT/JP2020/045389
§ 371 (c)(1),
(2) Date: Jun. 23, 2022

(87) PCT Pub. No.: WO2021/131630
PCT Pub. Date: Jul. 1, 2021

(65) Prior Publication Data
US 2023/0036970 A1 Feb. 2, 2023

(30) Foreign Application Priority Data
Dec. 27, 2019 (JP) ................................. 2019-239344

(51) Int. Cl.
B01J 21/04 (2006.01)
B01D 53/94 (2006.01)
(Continued)

(52) U.S. Cl.
CPC .......... B01J 23/464 (2013.01); B01D 53/945 (2013.01); B01J 21/04 (2013.01); B01J 23/10 (2013.01);
(Continued)

(58) Field of Classification Search
CPC ........ B01J 21/04; B01J 21/063; B01J 21/066; B01J 21/08; B01J 23/10; B01J 23/42;
(Continued)

(56) References Cited

U.S. PATENT DOCUMENTS 7,759,290 B2 * 7/2010 Murabayashi ......... B01J 23/464
502/439
8,667,785 B2 * 3/2014 Blakeman ................ B01J 23/44
60/299
(Continued)

FOREIGN PATENT DOCUMENTS

CN 107073465 A 8/2017
CN 107249738 A 10/2017
(Continued)

OTHER PUBLICATIONS

International Preliminary Report on Patentability, PCT/JP2020/045389, mailed Jul. 7, 2022.
(Continued)

*Primary Examiner* — Cam N. Nguyen
(74) *Attorney, Agent, or Firm* — Occhiuti & Rohlicek LLP

(57) ABSTRACT

An exhaust gas purifying catalyst includes a base material and a catalyst layer. A first catalyst region including the catalyst layer formed therein is provided on an entry side surface of a partition wall of the base material. A second catalyst region including the catalyst layer formed on a wall surface of a pore is provided in a prescribed region from an exit side surface of the partition wall toward an entry side cell. A catalyst unformed region in which a catalyst layer is substantially not formed is provided between the first and second catalyst regions in the thickness direction Y of the partition wall. Thus, it is possible to prevent the deposition of PMs in the second catalyst region including the catalyst layer formed in the pore, and to establish the compatibility
(Continued)

between the noxious gas purifying performance and the pressure loss suppressing performance at a high level.

20 Claims, 10 Drawing Sheets

(51) Int. Cl.
| | | |
|---|---|---|
| *B01J 21/06* | (2006.01) | |
| *B01J 21/08* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 35/00* | (2006.01) | |
| *B01J 35/56* | (2024.01) | |
| *F01N 3/10* | (2006.01) | |
| *F01N 3/28* | (2006.01) | |

(52) U.S. Cl.
CPC ............... *B01J 35/19* (2024.01); *B01J 35/56* (2024.01); *F01N 3/101* (2013.01); *F01N 3/2828* (2013.01); *B01D 2255/1025* (2013.01); *B01D 2255/908* (2013.01); *B01D 2255/9155* (2013.01); *B01D 2255/9202* (2013.01); *F01N 2330/06* (2013.01); *F01N 2370/02* (2013.01)

(58) Field of Classification Search
CPC . B01J 23/44; B01J 23/464; B01J 23/63; B01J 35/19; B01J 35/56; B01J 53/945; F01N 3/101; F01N 3/2828
USPC ........ 502/258–262, 302–304, 332–334, 339, 502/349–351, 355, 415, 439, 527.12, 502/527.13
See application file for complete search history.

(56) References Cited

U.S. PATENT DOCUMENTS

| | | | |
|---|---|---|---|
| 8,668,891 B2* | 3/2014 | Blakeman | F01N 13/02 60/299 |
| 9,046,022 B2* | 6/2015 | Blakeman | B01J 23/44 |
| 9,259,684 B2* | 2/2016 | Blakeman | B01J 23/42 |
| 9,333,461 B2* | 5/2016 | Castagnola | B01J 23/42 |
| 10,022,671 B2* | 7/2018 | Sekine | F01N 3/035 |
| 10,207,254 B2* | 2/2019 | Blakeman | B01J 23/63 |
| 10,688,475 B2* | 6/2020 | Blakeman | B01J 21/04 |
| 11,097,260 B2* | 8/2021 | Kurihara | B01J 35/657 |
| 11,454,149 B2* | 9/2022 | Onoe | B01D 46/2474 |
| 2009/0247396 A1 | 10/2009 | Mizutani | |
| 2009/0270250 A1 | 10/2009 | Tanaami et al. | |
| 2017/0122176 A1 | 5/2017 | Nomura et al. | |
| 2017/0306823 A1 | 10/2017 | Onoe et al. | |
| 2018/0021767 A1 | 1/2018 | Onoe et al. | |
| 2018/0028972 A1 | 2/2018 | Kitamura et al. | |
| 2018/0266290 A1* | 9/2018 | Burgess | B01D 53/9468 |
| 2020/0276567 A1 | 9/2020 | Onoe et al. | |
| 2021/0189930 A1 | 6/2021 | Sugawara | |
| 2022/0025796 A1* | 1/2022 | Vjunov | B01J 23/89 |

FOREIGN PATENT DOCUMENTS

| | | |
|---|---|---|
| CN | 110446551 A | 11/2019 |
| JP | 2009226376 A | 10/2009 |
| JP | 2009262102 A | 11/2009 |
| JP | 2013184075 A | 9/2013 |
| JP | 2017082745 A | 5/2017 |
| JP | 2018187595 A | 11/2018 |
| WO | 2016060048 A1 | 4/2016 |
| WO | 2016133086 A1 | 8/2016 |
| WO | 2016133087 A1 | 8/2016 |

OTHER PUBLICATIONS

Extended European Search Report, EP20905822.1, mailed Feb. 20, 2023.
Indian Office Action, IN 202227041948, mailed Oct. 13, 2022.
Office Action issued in Chinese Application No. 202080090525.2 dated Mar. 12, 2024.
Second Office Action issued in Indian Application No. IN202227041948 dated Nov. 20, 2023.
Office Action issued in Japanese Application No. JP2019239344 dated Nov. 30, 2023.
International Search Report, Feb. 9, 2021, 3 Pages.

* cited by examiner

EXHAUST GAS PURIFICATION CATALYST

CROSS REFERENCE TO RELATED APPLICATIONS

This application is a U.S. national stage application of International Application no. PCT/JP2020/045389, filed Dec. 7, 2020, which claims the benefit of the filing date of Japanese Application No. 2019-239344, filed Dec. 27, 2019, the contents of which are hereby incorporated by reference in their entirety.

TECHNICAL FIELD

The present invention relates to an exhaust gas purifying catalyst arranged in the exhaust system of an internal combustion engine. More particularly, it relates to an exhaust gas purifying catalyst including a wall flow type base material and a catalyst layer formed on the base material.

BACKGROUND ART

The exhaust gases exhausted from an internal combustion engine such as an automotive engine include noxious gas components such as hydrocarbon (HC), carbon monoxide (CO), and nitrogen oxide ($NO_x$), particulate matters: PMs, and the like. For this reason, in the exhaust system of the internal combustion engine, an exhaust gas purifying catalyst for purifying the noxious gas components, and collecting PMs is arranged.

For example, an exhaust gas purifying catalyst includes a wall flow type base material, and a catalyst layer formed on the base material. The wall flow type base material includes an entry side cell opened only at the end on the exhaust gas inflow side, an exit side cell opened only at the end on the exhaust gas outflow side, and a porous partition wall for separating both the cells. Then, on the partition wall of the base material, a catalyst layer is formed. The exhaust gas fed to the exhaust gas purifying catalyst of such a structure flows into the entry side cell, and passes through the partition wall, and then is exhausted from the exit side cell. At this step, the PMs are collected to the porous partition wall, and the catalyst layer formed on the partition wall purifies the noxious gas components.

As the related art literature regarding the wall flow type exhaust gas purifying catalyst, mention may be made of Patent Literature 1 to 3. For example, Patent Literature 1 discloses an exhaust gas purifying catalyst in which two kinds of catalyst layers are provided in the inside of the partition wall (i.e., the wall surface of a pore of the partition wall). The exhaust gas purifying catalyst disclosed in such literature includes a first catalyst layer provided in the region in the inside of the partition wall, and in contact with the entry side cell, and a second catalyst layer provided in the region in the inside of the partition wall, and in contact with the exit side cell. Then, in the Patent Literature, the ratio ($D_2/D_1$) of the coat density $D_2$ of the second catalyst layer to the coat density $D_1$ of the first catalyst layer is set at 1.01 or more and 1.4 or less.

CITATION LIST

Patent Literature

Patent Literature 1: WO 2016/133087
Patent Literature 2: Japanese Patent Application Publication No. 2013-184075
Patent Literature 3: Japanese Patent Application Publication No. 2018-187595

SUMMARY OF INVENTION

Technical Problem

Incidentally, in order to improve the purification performance of the noxious gas component in this kind of exhaust gas purifying catalyst, conceivably, the amount of the catalyst layer formed in the pore of the partition wall is increased. As a result, the contact frequency between the catalyst layer and the noxious gas component increases. On the other hand, when the catalyst layer is formed on the wall surface of the pore, the pore narrows. For this reason, when PMs are collected, the pore may be blocked, which may result in a sharp increase in loss of pressure (which will also be referred to as "pressure loss"). Namely, with the wall flow type exhaust gas purifying catalyst, it has been considered that the noxious gas purifying performance and the pressure loss suppressing performance are in a trade-off relationship.

The present invention has been created in order to solve the foregoing problem. It is an object thereof to provide a wall flow type exhaust gas purifying catalyst capable of establishing the compatibility between the noxious gas purifying performance and the pressure loss suppressing performance at a high level.

Solution to Problem

In order to implement the foregoing object, the present invention provides an exhaust gas purifying catalyst with the following configuration.

The exhaust gas purifying catalyst herein disclosed includes a wall flow type base material, and a catalyst layer formed on the base material. The base material of such an exhaust gas purifying catalyst includes an entry side cell opened only at the end on the exhaust gas inflow side, an exit side cell opened only at the end on the exhaust gas outflow side, and a partition wall for separating the entry side cell and the exit side cell, and including a plurality of pores for establishing a communication between the entry side cell and the exit side cell. Then, on the surface (entry side surface) of the partition wall in contact with the entry side cell, a first catalyst region including a catalyst layer formed therein is provided. In a prescribed region from the surface (exit side surface) of the partition wall in contact with the exit side cell toward the entry side cell of the partition wall, a second catalyst region including a catalyst layer formed on the wall surface of the pores is provided. Further, a catalyst unformed region in which the catalyst layer is substantially nor formed is provided between the first catalyst region and the second catalyst region in the thickness direction of the partition wall.

With the exhaust gas purifying catalyst herein disclosed, in the first catalyst region and the catalyst unformed region, the PMs in the exhaust gas can be sufficiently removed. For this reason, it is possible to prevent the PMs from reaching the second catalyst region with the pores narrowed by the catalyst layer, and to suppress a sharp increase in pressure loss due to the blockage of the pores. Then, with the exhaust gas purifying catalyst herein disclosed, purification of noxious gas components such as CO, HC, and $NO_x$ is performed mainly in the second catalyst region. At this step, the coating of the catalyst layer in the second catalyst region with the PMs is prevented. For this reason, even without an increase in amount of the catalyst layer to be formed, it is possible to sufficiently ensure the contact frequency between the catalyst layer and the noxious gas components. Accordingly, a high noxious gas purifying performance can be exhibited. For this reason, in accordance with the present embodiment, it is possible to establish a compatibility between the noxious gas purifying performance and the pressure loss suppressing performance at a high level.

In a preferable aspect of the exhaust gas purifying catalyst herein disclosed, each of the first catalyst region, the second catalyst region, and the catalyst unformed region is provided in a region of 50% or more of the full length of the base material from the end on the exhaust gas inflow side toward the end on the exhaust gas outflow side of the base material.

Generally, to the partition wall in the vicinity of the end on the exhaust gas inflow side, an exhaust gas including a large amount of PMs tends to be supplied. For this reason, by providing a laminate structure including the first catalyst region, the second catalyst region, and the catalyst unformed region present in a region of 50% or more from the exhaust gas inflow side, it is possible to establish a compatibility between the noxious gas purifying performance and the pressure loss suppressing performance at a sufficiently high level.

In accordance with a preferable aspect of the exhaust gas purifying catalyst herein disclosed, the dimension of the first catalyst region in the thickness direction of the partition wall is 3 μm or more and 50 μm or less.

Although depending upon various conditions such as the base material size, the cross sectional area, the cell thickness, and the pore diameter, as one example, by ensuring a dimension of the first catalyst region in the thickness direction of 3 μm or more, it is possible to preferably prevent the entry of PMs into the pores of the partition wall. On the other hand, by setting the dimension of the first catalyst region at 50 μm or less, it is possible to reduce the initial pressure loss before supply of an exhaust gas.

In accordance with a preferable aspect of the exhaust gas purifying catalyst herein disclosed, the dimension of the catalyst unformed region in the thickness direction of the partition wall is 10 μm or more and 100 μm or less.

By ensuring a dimension of the catalyst unformed region in the thickness direction of 10 μm or more, it is possible to preferably prevent PMs from reaching the second catalyst region. On the other hand, by setting the dimension of the catalyst unformed region at 100 μm or less, it is possible to ensure the dimension of the second catalyst region, and to allow the noxious gas purifying performance to be sufficiently exhibited.

In accordance with a preferable aspect of the exhaust gas purifying catalyst herein disclosed, the catalyst layer includes a three-way catalyst for oxidizing CO and HC, and reducing $NO_x$, and a carrier for carrying the three-way catalyst thereon.

By forming the catalyst layer including a three-way catalyst, it is possible to purify each of CO, HC, and $NO_x$ of noxious gas components with efficiency.

Further, in accordance with an aspect including the three-way catalyst, the three-way catalyst preferably includes at least any of the group consisting of Pt, Pd, and Rh.

By using these as a three-way catalyst, it is possible to more preferably improve the noxious gas purifying performance.

Still further, in accordance with an aspect including the three-way catalyst, the content of the three-way catalyst per a volume of 1 L of the base material is preferably 0.1 g/L or more and 7 g/L or less.

As a result of this, it is possible to ensure a sufficient noxious gas purifying performance at a low cost. Incidentally, the term "the content of the three-way catalyst per a volume of 1 L of the base material" is the value obtained by dividing the total amount (g) of the three-way catalyst present in each of the first catalyst region and the second catalyst region by the volume (L) of the base material.

Furthermore, in accordance with an aspect including the carrier, the carrier preferably includes at least any of alumina, ceria, zirconia, silica, and titania.

The metal oxides each have a large specific surface area, and each have high durability (particularly, heat resistance). For this reason, in accordance with the present aspect, it is possible to allow the noxious gas purifying performance by the three-way catalyst to be exhibited with efficiency.

Further, in an aspect including the three-way catalyst and the carrier, preferably, the catalyst layer includes an OSC material having an oxygen occluding ability.

As a result of this, the exhaust gas atmosphere in the inside of the catalyst layer can be kept in the vicinity of the stoichiometry (stoichiometric air-to-fuel ratio) with stability. For this reason, it is possible to allow the noxious gas purifying performance by the three-way catalyst to be exhibited with stability. Incidentally, preferable examples of such an OSC material may include a ceria-zirconia composite oxide.

Furthermore, in accordance with an aspect including the three-way catalyst and the carrier, the catalyst layer includes one or two or more of any of an oxide, a sulfuric acid salt, a carbonic acid salt, a nitric acid salt, or a chloride of an alkaline-earth metal, a rare earth metal, an alkali metal, and a transition metal.

The catalyst layer in the exhaust gas purifying catalyst herein disclosed is not limited to the aspects including only the three-way catalyst and the carrier. For example, the catalyst layer may include each foregoing component.

In accordance with a preferable aspect of the exhaust gas purifying catalyst herein disclosed, the amount of the catalyst layer formed per a volume of 1 L of the base material is 20 g/L or more and 180 g/L or less.

As a result of this, it is possible to establish the compatibility between the noxious gas purifying performance and the pressure loss suppressing performance at a higher level. Incidentally, the term "the amount of the catalyst layer formed per a volume of 1 L of the base material" is the value obtained by dividing the total amount (g) of the catalyst layer present in each region of the first catalyst region and the second catalyst region by the volume (L) of the base material.

DESCRIPTION OF EMBODIMENTS

Figure 1:
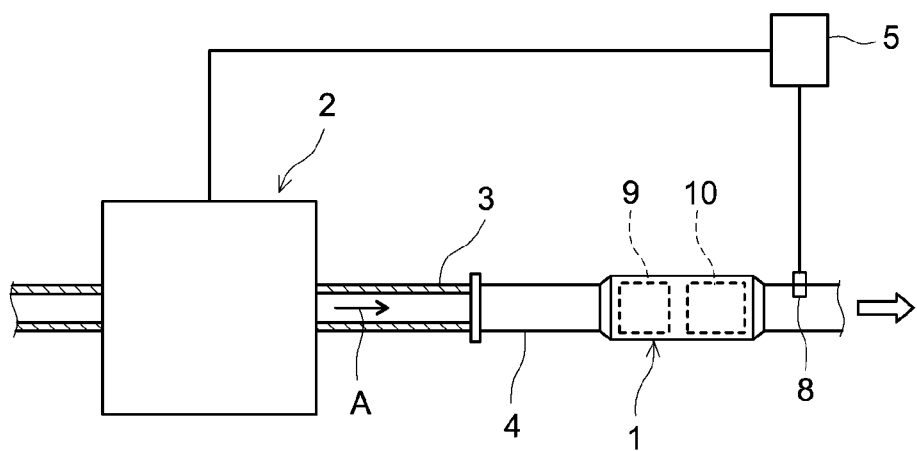
FIG. 1 is a view schematically showing an exhaust system of an internal combustion engine including an exhaust gas purification device arranged therein.

Below, with reference to the accompanying drawings, embodiments of the present invention will be described. In the following drawings, the members/parts producing the same action are given the same reference numerals and signs, and an overlapping description may be omitted or simplified. The relationships of the dimensions (such as the length, the width, and the thickness) in each drawing does not always reflect the actual dimensional relationship. Incidentally, matters necessary for executing the present invention, except for matters specifically referred to in the present description (e.g., general items on setting of an exhaust gas purifying catalyst in an exhaust system) can be grasped as design matters of those skilled in the art based on the related art in the present field. The present invention can be executed based on the contents disclosed in the present description and the technical knowledge in the field.

<Exhaust Gas Purification Device>

First, an exhaust gas purification device including an exhaust gas purifying catalyst in accordance with one embodiment of the present invention will be described. FIG. 1 is a view schematically showing an exhaust system of an internal combustion engine including the exhaust gas purification device arranged therein. Incidentally, an arrow A in FIG. 1 shows the circulation of the exhaust gas. For convenience of description, in the present description, the direction in which an exhaust gas is supplied is referred to as "upstream", and the direction in which an exhaust gas is exhausted is referred to as "downstream".

An exhaust gas purification device 1 is provided in an exhaust system of an internal combustion engine (engine) 2. To the internal combustion engine 2, a mixed gas including oxygen and a fuel gas is supplied. The internal combustion engine 2 burns the mixed gas, and converts the combustion energy into a mechanical energy. As one example, the internal combustion engine 2 mainly includes a gasoline engine. Incidentally, the internal combustion engine 2 may be an engine other than a gasoline engine (e.g., a diesel engine).

The mixed gas burned at the internal combustion engine 2 is exhausted as an exhaust gas to the exhaust system. The exhaust system of the internal combustion engine 2 is provided with an exhaust manifold 3, an exhaust pipe 4, and an exhaust gas purification device 1 sequentially from the upstream side. The exhaust gas purification device 1 purifies the noxious gas components (CO, HC, and $NO_x$) included in the exhaust gas exhausted from the internal combustion engine 2, and removes PMs.

Specifically, the exhaust gas purification device 1 is connected to an exhaust port (not shown) of the internal combustion engine 2 via the exhaust manifold 3 and the exhaust pipe 4. Further, the exhaust gas purification device 1 shown in FIG. 1 includes a temperature increasing catalyst 9. The temperature increasing catalyst 9 has a function of increasing the temperature of an exhaust gas. The specific configuration of the temperature increasing catalyst 9 does not characterize the technology herein disclosed, and hence a detailed description thereon is omitted. In addition, the temperature increasing catalyst 9 is not an essential configuration of the exhaust gas purification device 1, and can also be omitted.

Incidentally, with the exhaust system of the internal combustion engine 2 shown in FIG. 1, a pressure sensor 8 is arranged downstream of the exhaust gas purification device 1. The pressure sensor 8 is connected with an ECU (Engine Control Unit) 5. The ECU 5 is a control device for controlling the operation of the internal combustion engine 2. The ECU 5 can include a CPU: central processing unit for executing an instruction of a control program, a ROM (read only memory) for storing the control program executed by the CPU, a RAM (random access memory) to be used as a working area for expanding the control program, and a storage device (recording medium) such as a memory for storing various information. For example, the ECU 5 uses the pressure loss value detected at the pressure sensor 8 as one of the information for controlling the operation of the internal combustion engine 2.

Then, an exhaust gas purifying catalyst 10 in accordance with the present embodiment is arranged in the inside of the exhaust gas purification device 1 (typically, on the downstream side of the temperature increasing catalyst 9). With such an exhaust gas purifying catalyst 10, purification of the noxious gas components and removal of PMs are performed. Below, a specific structure of the exhaust gas purifying catalyst 10 in accordance with the present embodiment will be described.

<Exhaust Gas Purifying Catalyst>

Figure 2:
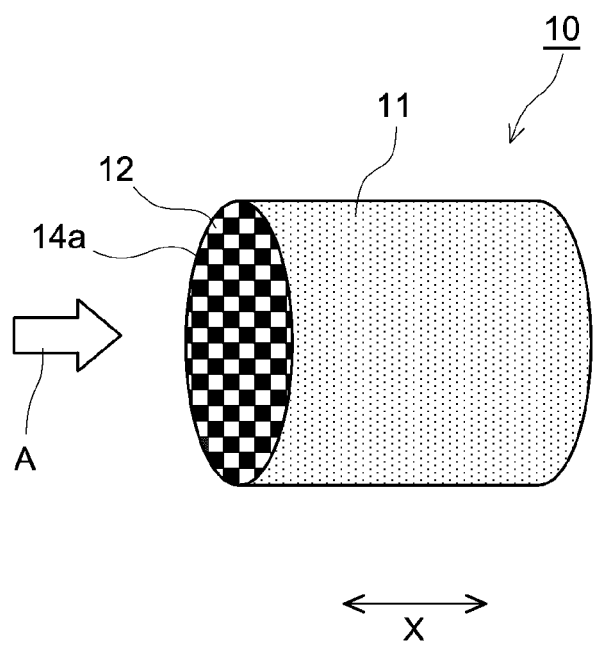
FIG. 2 is a perspective view schematically showing an exhaust gas purifying catalyst in accordance with one embodiment of the present invention.
Figure 3:
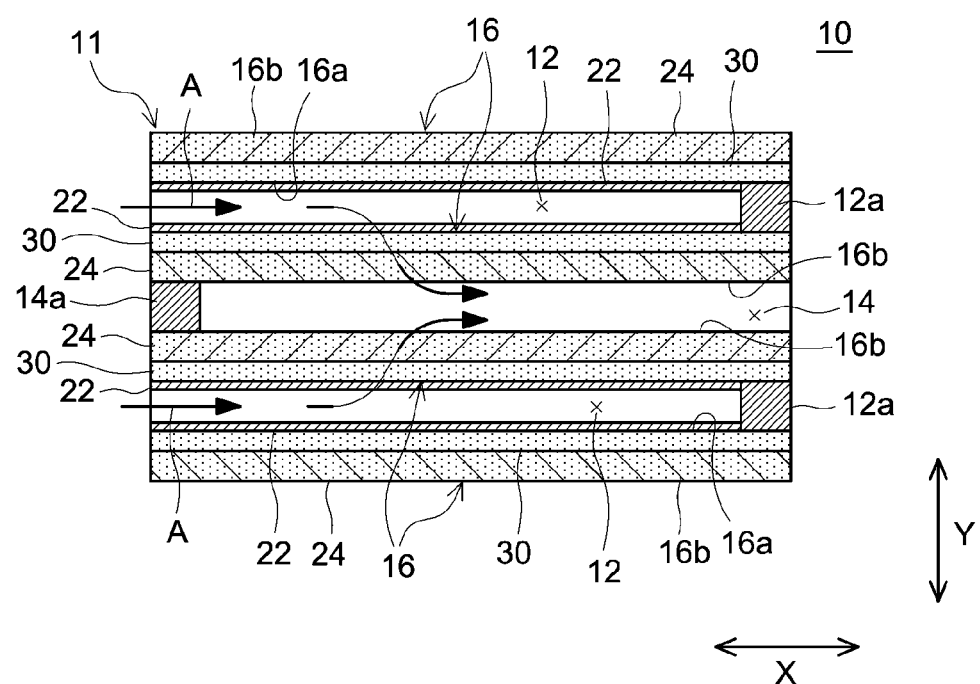
FIG. 3 is a view schematically showing a cross section along the tube axis direction of an exhaust gas purifying catalyst in accordance with one embodiment of the present invention.
Figure 4:
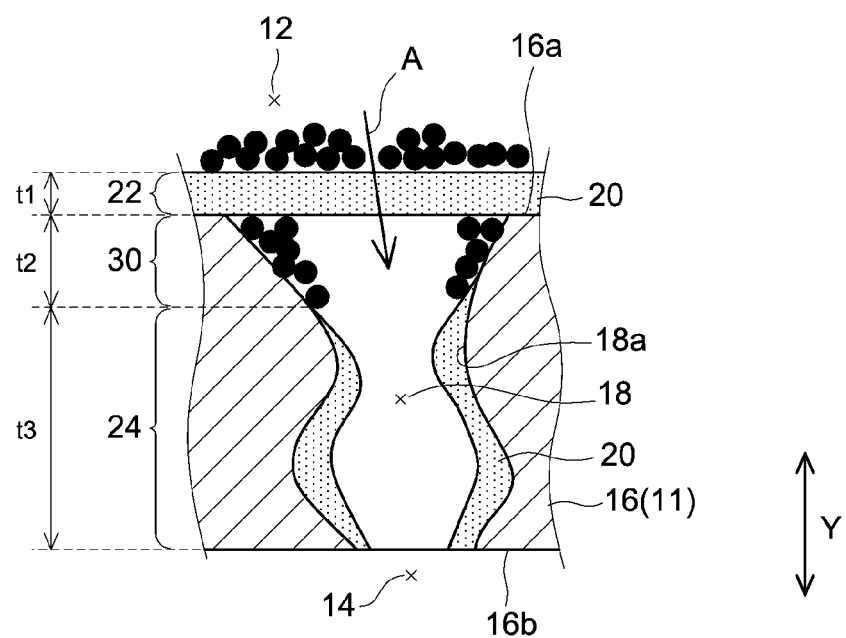
FIG. 4 is an enlarged cross-sectional view schematically showing a cross section of a partition wall of a base material of an exhaust gas purifying catalyst in accordance with one embodiment of the present invention.

FIG. 2 is a perspective view schematically showing the exhaust gas purifying catalyst in accordance with the present embodiment. FIG. 3 is a view schematically showing the cross section along the tube axis direction of the exhaust gas purifying catalyst in accordance with the present embodiment. FIG. 4 is an enlarged cross sectional view schematically showing the cross section of the partition wall of the base material of the exhaust gas purifying catalyst in accordance with the present embodiment. Incidentally, as with FIG. 1 described above, each arrow A in FIGS. 2 to 4 indicates the circulation of an exhaust gas. Further, a sign X in FIGS. 2 to 4 indicates the "direction of extension of the partition wall", and a sign Y indicates the "thickness direction of the partition wall of the base material".

As shown in FIGS. 2 to 4, the exhaust gas purifying catalyst 10 in accordance with the present embodiment includes a wall flow type base material 11, and a catalyst layer 20 formed on the base material 11.

1. Base Material

The base material 11 forms the skeleton of the exhaust gas purifying catalyst 10. As shown in FIG. 2, in the present embodiment, a cylindrical base material 11 is used. Incidentally, the outer shape of the base material has no particular restriction, and may be an elliptic cylindrical shape, a polygonal cylindrical shape, or the like. Further, the total length and the volume of the base material 11 also have no particular restriction, and can be appropriately changed according to the performances of the internal combustion engine 2 (see FIG. 1), or the like. Furthermore, for the base material 11, various materials conventionally used for this kind of uses can be appropriately adopted. As one example, for the materials for the base material 11, ceramics such as cordierite, aluminum titanate, and silicon carbide (SiC), and a highly heat-resistant material as typified by an alloy such as stainless steel can be used.

The base material 11 in the present embodiment is a wall flow type base material. Specifically, as shown in FIGS. 2 and 3, the base material 11 includes an entry side cell 12 opened only at the end on the exhaust gas inflow side, an exit side cell 14 opened only at the end on the exhaust gas outflow side, and a porous partition wall 16 for separating the entry side cell 12 and the exit side cell 14. Specifically, the entry side cell 12 is a gas passage opened at the end on the exhaust gas inflow side, and blocked at the end on the exhaust gas outflow side by a sealing part 12*a*. On the other hand, the exit side cell 14 is a gas passage blocked at the end on the exhaust gas inflow side by a sealing part 14*a*, and opened at the end on the exhaust gas outflow side. Further, the partition wall 16 is a partition material including a plurality of pores through which an exhaust gas can pass formed therein. The partition wall 16 has a plurality of pores 18 (see FIG. 4) for establishing a communication between the entry side cell 12 and the exit side cell 14. Incidentally, in the exhaust gas purifying catalyst 10 in accordance with the present embodiment, the shape of the entry side cell 12 (exit side cell 14) in cross section perpendicular to the extension direction X of the partition wall 16 is a square (see FIG. 1). However, the shape of the entry side cell (exit side cell) in cross section perpendicular to the extension direction is not limited to a square, and various shapes can be adopted. For example, various geometrical shapes including a rectangular shape such as a parallelogram, a rectangle, or a trapezoid, a triangle shape, or other polygonal shapes (e.g., a hexagon and an octagon), a circular shape, and the like are also acceptable.

Incidentally, the partition wall 16 of the base material 11 is preferably formed in consideration of the PM collecting performance, the pressure loss suppressing performance, and the like. For example, the thickness of the partition wall 16 is preferably about 25 μm to 100 μm. Further, the porosity of the partition wall 16 is preferably about 20 vol % to 70 vol %. Furthermore, from the viewpoint of sufficiently ensuring the air permeability of the partition wall 16 and suppressing the increase in pressure loss, the average pore diameter of the pores 18 is preferably 8 μm or more, more preferably 12 μm or more, and further preferably 15 μm or more. On the other hand, from the viewpoint of ensuring the proper PM collecting performance, the upper limit value of the average pore diameter of the pores 18 is preferably 30 μm or less, more preferably 25 μm or less, and further preferably 20 μm or less. Incidentally, the porosity and the average pore diameter of the partition wall 16 are the values measured by a mercury porosimetry.

2. Catalyst Layer

As shown in FIG. 4, the catalyst layer 20 is formed on the partition wall 16 of the base material 11 (specifically the entry side surface 16*a* of the partition wall 16 and the wall surface 18*a* of the pore 18). In the exhaust gas purifying catalyst 10 in accordance with the present embodiment, the amount of the catalyst layer 20 formed per a volume of 1 L of the base material 11 is preferably 20 g/L or more, more preferably 40 g/L or more, further preferably 60 g/L or more, and in particular preferably 80 g/L or more from the viewpoint of improving the noxious gas purifying performance. On the other hand, the upper limit value of the amount of the catalyst layer 20 to be formed is preferably 180 g/L or less, more preferably 160 g/L or less, further preferably 140 g/L or less, and in particular preferably 120 g/L or less from the viewpoint of improving the pressure loss suppressing performance. Incidentally, the term "the amount of the catalyst layer 20 to be formed" herein is the total amount of the catalyst layers 20 formed in each of a first catalyst region 22 and a second catalyst region 24.

The catalyst layer 20 is a porous layer including a catalyst metal. Typically, the catalyst layer 20 is formed by aggregation of composite particles including a catalyst metal carried on a carrier. For example, the catalyst layer 20 includes a three-way catalyst and a carrier carrying the three-way catalyst thereon. The three-way catalyst indicates a catalyst metal oxidizing CO and HC in the exhaust gas, and reducing $NO_x$. By forming the catalyst layer 20 including such a three-way catalyst, it is possible to purify the noxious gas components in the exhaust gas with efficiency. Examples of such a three-way catalyst may include particles mainly including platinum group elements such as platinum (Pt), palladium (Pd), rhodium (Rh), ruthenium (Ru), osmium (Os), and iridium (Ir). Incidentally, out of the platinum group elements, Pt, Pd, and Rh are high in oxidization activity, and hence can exhibit a preferable noxious gas purifying performance. Further, from the viewpoint of improving the noxious gas purifying performance, the content of the three-way catalyst per a volume of 1 L of the base material 11 is preferably 0.1 g/L or more, more preferably 0.5 g/L or more, and in particular preferably 1 g/L or more. On the other hand, from the viewpoint of reduction of the material cost, the upper limit value of the content of the three-way catalyst is preferably 10 g/L or less, more preferably 8 g/L or less, and in particular preferably 7 g/L or less. Incidentally, as with the term "the amount of the catalyst layer to be formed", the term "the content of the three-way catalyst" herein is the total content of the catalyst layers 20 formed in each of the first catalyst region 22 and the second catalyst region 24.

On the other hand, for the carrier carrying a catalyst metal thereon, a metal oxide is preferably used. Examples of such a metal oxide may include alumina ($Al_2O_3$), ceria ($CeO_2$), zirconia ($ZrO_2$), silica ($SiO_2$), and titania ($TiO_2$). The metal oxides each have a large specific surface area, and has high durability (particularly, heat resistance), and hence can allow the noxious gas purifying performance by a catalyst metal (typically, a three-way catalyst) to be exhibited with efficiency.

Further, the catalyst layer 20 may include other additives. Examples of such other additives may include an OSC material. The OSC material indicates a material having an OSC: Oxygen Storage Capacity, and occluding/releasing oxygen. By adding the OSC material, it is possible to keep the exhaust gas atmosphere in contact with the catalyst layer 20 in the vicinity of the stoichiometry (stoichiometric air-to-fuel ratio) with stability. For this reason, it is possible to stabilize the catalyst action of the three-way catalyst. Examples of such an OSC material may include a ceria-zirconia composite oxide. Further, as other additives than the OSC material, mention may be made of a $NO_x$ adsorbent having a $NO_x$ occluding ability, a stabilizer, or the like. Further, the catalyst layer 20 may include a trace amount of component derived from the raw material or the manufacturing step. For example, the catalyst layer 20 may include one or two or more of any of an oxide, a sulfuric acid salt, carbonic acid salt, a nitric acid salt, or a chloride of alkaline-earth metal (such as Be, Mg, Ca, or Ba), a rare earth metal (such as Y, La, or Ce), an alkali metal (such as Li, Na, or K), or a transition metal (such as Mn, Fe, Co, or Ni).

Then, with the exhaust gas purifying catalyst 10 in accordance with the present embodiment, from the view point of establishing the compatibility between the noxious gas purifying performance and the pressure loss suppressing performance at a high level, the region in which the catalyst layer 20 is formed (catalyst region) is defined. Specifically, as shown in FIGS. 3 and 4, the partition wall 16 of the base material 11 in the present embodiment is provided with the first catalyst region 22 and the second catalyst region 24. Further, in the present embodiment, a catalyst unformed region 30 in which the catalyst layer 20 is substantially not formed is also provided. Below, each region will be specifically described.

(1) First Catalyst Region

As shown in FIGS. 3 and 4, the first catalyst region 22 is provided on the surface (entry side surface 16a) of the partition wall 16 in contact with the entry side cell 12. Provision of the first catalyst region 22 allows the opening on the entry side cell 12 side of the pore 18 to be covered with the catalyst layer 20. For this reason, most of the PMs in the exhaust gas are collected to the upstream side of the first catalyst region 22 (in the entry side cell 12) before entry into the pore 18. As a result of this, it is possible to prevent the deposition of a large amount of PMs in the inside of the pore 18, and the blockage of the pore 18.

Incidentally, the catalyst layer 20 in the first catalyst region 22 is preferably formed so as to properly collect PMs, and to ensure a sufficient gas permeability. From such a viewpoint of forming a catalyst layer having such a proper density, the catalyst layer 20 in the first catalyst region 22 is preferably formed of composite particles having a smaller particle diameter than that of the pore 18 of the partition wall 16. Specifically, the average particle diameter of the composite particles included in the catalyst layer 20 in the first catalyst region 22 is preferably 5 μm or less, more preferably 2.5 μm or less, and further preferably 2 μm or less, and is, for example, about 1 μm. Use of such microscopic particles can prevent the entry of PMs into the inside of the pore 18 with reliability. Further, the lower limit value of the average particle diameter of the composite particles has no particular restriction, and may be 0.01 μm or more, may be 0.05 μm or more, may be 0.1 μm or more, and may be 0.5 μm or more. Incidentally, in the present description, the term "average particle diameter" is the cumulative 50% particle diameter (D50) in the particle size distribution by volume measured by a particle size distribution measuring device based on the laser diffraction/scattering method. Specifically, as the average particle diameter, the value measured by setting the refractive index at 1.20+0.01i (i is the imaginary term) using a laser diffraction/scattering particle size distribution measuring device (manufactured by Horiba Seisakusho Co., Ltd., LA-920) can be adopted. Incidentally, the term "pri-mary particle" herein indicates a microscopic particle forming a secondary particle aggregated by aggregation, sintering, or the like.

Further, the dimension t1 of the first catalyst region 22 in the thickness direction Y is preferably 3 μm or more, more preferably 5 μm or more, and in particular preferably 10 μm or more. As a result of this, it is possible to sufficiently ensure the PM collecting performance in the first catalyst region 22, and to preferably prevent the entry of PMs into the pore 18 of the partition wall 16. On the other hand, with an increase in dimension t1 of the first catalyst region 22 in the thickness direction Y, the gas permeability tends to be reduced, resulting in an increase in initial pressure loss. From such a viewpoint, the dimension t1 of the first catalyst region 22 in the thickness direction Y is preferably 50 μm or less, more preferably 40 μm or less, and in particular preferably 30 μm or less.

(2) Catalyst Unformed Region

As described above, a catalyst unformed region 30 is the region in which the catalyst layer is substantially not formed. The catalyst unformed region 30 is provided between the first catalyst region 22 and the second catalyst region 24 in the thickness direction Y of the partition wall 16. In other words, the catalyst unformed region 30 is the region provided from the entry side surface 16a of the partition wall 16 toward the exit side cell 14, and the region in which the most part of the wall surface 18a of the pore 18 is exposed. As shown in FIG. 4, with the exhaust gas purifying catalyst 10 in accordance with the present embodiment, the most part of PMs in an exhaust gas are collected by the first catalyst region 22. However, when a catalyst layer is formed on the wall surface of the pore, the pore narrows considerably. For this reason, even only the deposition of a small amount of PMs which have passed through the first catalyst region 22 may block the pore. In contrast, in the present embodiment, the catalyst unformed region 30 in which a catalyst layer is not formed is provided on the downstream side of the first catalyst region 22. As a result of this, it is possible to surely prevent PMs from reaching the region in which the pore 18 is narrowed by the catalyst layer 20 (the second catalyst region 24).

In the present description, the wording "a catalyst layer being substantially not formed" denotes that a catalyst layer is intentionally not formed on the wall surface of the pore. Therefore, the case where a trace amount of catalyst layer is present in the region between the first catalyst region 22 and the second catalyst region 24 due to the error during manufacturing, or the like is included in the concept of the wording "a catalyst layer being substantially not formed" in the present description. Incidentally, whether the catalyst unformed region is provided, or not (i.e., whether positive formation of the catalyst layer between the first catalyst region and the second catalyst region is performed, or not) in a prescribed exhaust gas purifying catalyst can be determined according to the procedure described in "4. Determination procedure of each region" described later.

Further, the dimension t2 of the catalyst unformed region 30 in the thickness direction Y of the partition wall 16 is preferably 10 μm or more, more preferably 15 μm or more, and in particular preferably 20 μm or more. As a result of this, it is possible to suppress the PMs which have passed through the first catalyst region 22 from reaching the second catalyst region 24, resulting in an increase in pressure loss. On the other hand, the dimension of the catalyst unformed region 30 in the thickness direction Y is preferably 100 μm or less, more preferably 90 μm or less, and in particular preferably 80 μm or less. As a result of this, it is possible to ensure the region in which the second catalyst region 24 is formed, and to allow the noxious gas purifying performance to be sufficiently exhibited.

(3) Second Catalyst Region

As shown in FIG. 4, the second catalyst region 24 is the region in which the catalyst layer 20 is formed on the wall surface 18a of the pores 18 of the partition wall 16. The second catalyst region 24 is provided in a prescribed region from the surface (exit side surface 16b) of the partition wall 16 in contact with the exit side cell 14 toward the entry side cell 12. As described above, with the exhaust gas purifying catalyst 10 in accordance with the present embodiment, PMs are sufficiently collected in the first catalyst region 22 and the catalyst unformed region 30. For this reason, it is possible to prevent PMs from reaching the second catalyst region 24 with the pore 18 narrowed by the catalyst layer 20. For this reason, it is possible to prevent the blockage of the pore 18, which prevents a sharp increase in pressure loss in the second catalyst region 24. Further, in the present embodiment, the catalyst layer 20 in the second catalyst region 24 is less likely to be covered with PMs. For this reason, it is possible to sufficiently ensure the contact frequency between the catalyst layer 20 and the exhaust gas in the second catalyst region 24, so that a high noxious gas purifying performance can be exhibited.

The catalyst layer 20 in the second catalyst region 24 may have the same composition as that of the catalyst layer 20 in the first catalyst region 22, and may have a different composition. However, the catalyst layer 20 in the second catalyst region 24 is preferably configured so as not to block the pore 18, and to sufficiently ensure the contact frequency with an exhaust gas. From such a viewpoint, the catalyst layer 20 in the second catalyst region 24 is preferably formed of composite particles with a smaller particle diameter than that of the pore 18 of the partition wall 16 as with the first catalyst region 22. Namely, although the average particle diameter of the composite particles included in the catalyst layer 20 in the second catalyst region 24 depends upon the pore diameter of the partition wall 16 of the base material 11, it is preferably 5 μm or less, more preferably 2.5 μm or less, and further preferably 2 μm or less, and is, for example, about 1 μm. Use of such a microscopic particle can prevent the blockage of the pore 18, and can sufficiently ensure the contact frequency with an exhaust gas. Further, the lower limit value of the average particle diameter of the composite particle has no particular restriction, and may be 0.01 μm or more, may be 0.05 μm or more, may be 0.1 μm or more, and may be 0.5 μm or more.

Incidentally, the dimension t3 of the second catalyst region 24 in the thickness direction Y of the partition wall 16 can be determined based on the dimension t2 of the catalyst unformed region 30. As described above, when the dimension t2 of the catalyst unformed region 30 is increased, and the dimension t3 of the second catalyst region 24 is reduced, the pressure loss suppressing performance tends to be improved. On the other hand, when the dimension t2 of the catalyst unformed region 30 is reduced, and the dimension t3 of the second catalyst region 24 is increased, the noxious gas purifying performance tends to be improved.

3. Purification of Exhaust Gas in the Present Embodiment

Figure 11:
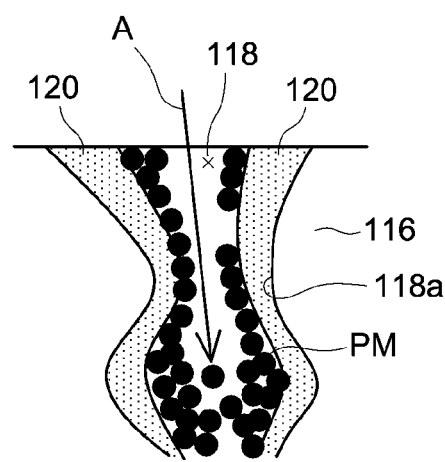
FIG. 11 is an enlarged cross-sectional view schematically showing the cross section of a partition wall of a base material of a conventional exhaust gas purifying catalyst.

Below, purification of an exhaust gas using the exhaust gas purifying catalyst of the present embodiment will be described with comparison with a conventional exhaust gas purifying catalyst. FIG. 11 is an enlarged cross sectional view schematically showing the cross section of the partition wall of the base material of a conventional exhaust gas purifying catalyst.

As shown in FIG. 11, with a conventional general exhaust gas purifying catalyst, a catalyst layer 120 is formed only on the wall surface 118a of the pore 118 of the partition wall 116. For this reason, the region for collecting PMs, and the region for purifying a noxious gas component are not divided, so that PMs are collected in the inside of the pore 118 narrowed by the catalyst layer 120. Therefore, when a given amount of exhaust gas is supplied, and PMs are deposited in the pore 118, the pore 118 may be blocked, which may result in a sharp increase in pressure loss. Further, the deposited PMs cover the catalyst layer 120. For this reason, the contact frequency between the catalyst layer 120 and an exhaust gas is reduced, so that the noxious gas purifying performance may also be reduced. Further, with such an exhaust gas purifying catalyst, it is not possible to collect PMs with a volume larger than that of the pore 118. For this reason, it is observed that the PM collecting performance also tends to be reduced with an elapse of time.

In contrast, as shown in FIG. 4, with the exhaust gas purifying catalyst 10 in accordance with the present embodiment, after sufficiently collecting PMs in the exhaust gas in the first catalyst region 22 and the catalyst unformed region 30, noxious gas components are purified in the second catalyst region 24. Namely, the region for collecting PMs and the region for purifying noxious gas components are divided. As a result of this, PMs are prevented from reaching the region with the pore 18 narrowed by the catalyst layer 20 (the second catalyst region 24), which can prevent a sharp increase in pressure loss due to blockage of the pore 18. Further, the catalyst layer 20 in the second catalyst region 24 can also be prevented from being covered with PMs. For this reason, the noxious gas purifying performance in the second catalyst region 24 can be kept high. Thus, with the exhaust gas purifying catalyst 10 in accordance with the present embodiment, it is possible to establish the compatibility between the noxious gas purifying performance and the pressure loss suppressing performance at a high level. In addition, in the present embodiment, most of PMs in an exhaust gas are collected in the first catalyst region 22, and remain in the entry side cell 12. The entry side cell 12 has a far larger volume than that of the pore 18, and hence the reduction of the PM collecting performance with an elapse of time can also be suppressed.

4. Determination Procedure of Each Region

The first catalyst region 22, the second catalyst region 24, and the catalyst unformed region 30 in the embodiment are identified based on the following determination procedural steps (a) to (k). Namely, whether three regions of the first catalyst region, the second catalyst region, and the catalyst unformed region are provided, or not in a prescribed exhaust gas purifying catalyst can be determined based on the following procedural steps.

(a) Ten specimens obtained by decomposing an exhaust gas purifying catalyst to be inspected, and embedding the partition wall of the base material with a resin are prepared.

(b) Each specimen is cut, and the cross section of the partition wall is exposed. Then, the exposed cross section of the partition wall is observed by a scanning electron microscope (SEM), thereby obtaining a cross section SEM observation image (backscattered electron image, an observation magnification of 200 times).

(c) Using two-dimensional image analysis software (product name: Image J (registered trademark)), the cross section SEM observation image is subjected to automatic binarization processing, thereby obtaining a binary format image reflecting only a catalyst layer.

(d) The images before and after the automatic binarization processing are compared, and the catalyst layer observed on the entry side surface of the partition wall is regarded as a "first catalyst region".

(e) The "total number of pixels of the catalyst layer" and the "total number of pixels of the whole binary format image" observed in the binary format image are counted. Then, the value obtained by dividing the "total number of pixels of the catalyst layer" by the "number of pixels of the whole binary format image" is calculated, and this is referred to as the "catalyst layer abundance ratio of the whole partition wall".

(f) The images before and after automatic binarization processing are compared, and a given region from the exit side surface of the partition wall toward the entry side cell is set, and the value obtained by dividing the "the number of pixels of the catalyst layer in the set region" by the "total number of pixels of the set region" is calculated, and is referred to as the "catalyst layer abundance ratio in the set region".

(g) The value obtained by dividing the "catalyst layer abundance ratio in the set region" by the "catalyst layer abundance ratio of the whole partition wall" is calculated, and whether this value is equal to, or larger than a first threshold value, or not is determined. Incidentally, the first threshold value in the present processing is set at, for example, 1.05 (preferably 1.1, more preferably 1.15, further preferably 1.2, and in particular preferably 1.25).

(h) The "given region from the exit side surface of the partition wall toward the entry side cell" described in the (f) is gradually expanded. Each time, the "catalyst layer abundance ratio in the set region" is calculated, and the value obtained by dividing the "catalyst layer abundance ratio in the set region" by the "catalyst layer abundance ratio of the whole partition wall" is calculated. Then, the set region is expanded until this value becomes smaller than the first threshold value.

(i) As a result of the processing (h), when the region having the value smaller than the first threshold value is observed, the region subjected to the previous determination is regarded as a "second catalyst region". Then, the region between the "first catalyst region" and the "second catalyst region" is referred to as a "third region".

(j) The value obtained by dividing the "number of pixels of the catalyst layer in the third region" with the "total number of pixels in the third region" is calculated. This is referred to as the "catalyst layer abundance ratio in the third region". Further, the value obtained by dividing the "catalyst layer abundance ratio in the third region" by the "catalyst layer abundance ratio in the whole image" is calculated. Then, when this value is equal to, or smaller than the second threshold value, the third region" is determined to be the "catalyst unformed region" (i.e., the catalyst unformed region is provided between the first catalyst region and the second catalyst region). Incidentally, the second threshold value in the present processing is set at, for example, 0.65 (preferably 0.5, more preferably 0.4, further preferably 0.3, in particular preferably 0.25).

(k) All the ten specimens are subjected to processing (b) to (j). In 50% or more of the specimens, when the catalyst unformed regions between the first catalyst region and the second catalyst region are observed, the exhaust gas purifying catalyst to be inspected is determined to have "the catalyst unformed region provided between the first catalyst region and the second catalyst region".

Incidentally, all the "dimensions t1 to t3 of respective regions in the thickness direction Y (see FIG. 4)" can be measured based on the interface of each region set in the setting procedural steps. Specifically, the "dimensions t1 to t3 of respective regions in the thickness direction Y" in the present description are the average values of the dimensions of respective regions observed in each of the ten specimens.

<Method for Manufacturing Exhaust Gas Purifying Catalyst>

The exhaust gas purifying catalyst 10 in accordance with the present embodiment can be manufactured, for example, based on the following procedural steps.

1. Filling of Organic Solid Content

With this manufacturing method, first, an organic solid content is filled from the entry side cell 12 into the pore 18 of the partition wall 16. Specifically, a pore filling slurry including the organic solid content dispersed in a specific disperse medium is prepared, and the pore filling slurry is introduced from the entry side cell 12 into the inside of the base material 11. Then, suction is performed from the exit side cell 14 of the base material 11, thereby causing the pore filling slurry to be permeated into the pore 18. Then, the drying step is carried out, and the disperse medium is removed, resulting in a base material 11 including the organic solid content filled in the pore 18. Incidentally, as the organic solid content, a conventionally known material can be used without particular restriction so long as it will be burnt in a burning step described later. Examples of the organic solid content may include a resin bead mainly formed of polyethylene, polypropylene, a melamine resin, a polymethyl methacrylate (PMMA) resin, or the like. Further, as other examples thereof, a resin fiber such as a cellulose microfiber can also be used. Further, the organic solid content is preferably adjusted in size so as to be preferably filled in the pore 18 of the partition wall 16. For example, when a resin bead is used as the organic solid content, the average particle diameter thereof is preferably set at about 100 μm or less (more preferably 50 μm or less, and further preferably 30 μm or less). Whereas, for the disperse medium, a liquid material can be used without particular restriction so long as it does not dissolve the organic solid content. Examples of such a disperse medium may include water and alcohol. Further, the concentration of the organic solid content in the pore filling slurry is preferably appropriately adjusted in consideration of the porosity of the partition wall 16 of the base material 11, and the like.

2. Preparation of Catalyst Layer Forming Slurry

Then, a catalyst layer forming slurry of the precursor of the catalyst layer 20 is prepared. Specifically, a metal oxide serving as a carrier and a compound serving as a source of supply for a catalyst metal are mixed in prescribed ratios, thereby preparing a mixed solution. Then, the prepared mixed solution is dried, followed by burning at prescribed temperature and time, thereby manufacturing a composite particle including the catalyst metal carried on the carrier. Then, such a composite particle is mixed with a desirable additive (e.g., an OSC material) in an appropriate solvent (e.g., ion exchanged water). This results in a catalyst layer forming slurry. Incidentally, the specific contents regarding the catalyst metal, the carrier, and other additives have already been described, and hence an overlapping description thereon is omitted.

3. Formation of First Catalyst Region

In the present step, the catalyst layer forming slurry is given to the entry side surface 16a of the partition wall 16, followed by drying/burning, thereby forming a catalyst layer 20 on the entry side surface 16a of the partition wall 16, and forming a first catalyst region 22. Specifically, after supplying the catalyst layer forming slurry to the entry side cell 12 of the base material 11, suction is performed from the exit side cell 14. At this step, the pore 18 of the partition wall 16 is filled with the organic solid content. For this reason, the slurry does not permeate into the inside of the partition wall 16, and is deposited on the entry side surface 16a. A dry treatment and a burning treatment are performed in this state, resulting in the formation of the first catalyst region 22 including the catalyst layer 20 formed on the entry side surface 16a of the partition wall 16. Still further, in the burning treatment, the organic solid content is burnt down, so that the blockage of the pore 18 is resolved. Incidentally, from the viewpoint of burning down the organic solid content with reliability, the temperature of the burning treatment is preferably 400° C. or more, more preferably 500° C. or more, and further preferably 600° C. or more. Similarly, in order to burn down the organic solid content with reliability, the burning time is preferably about 2 to 4 hours. Further, the conditions for the dry treatment have no particular restriction, and can be appropriately adjusted to the conditions under which the catalyst layer forming slurry is properly dried.

4. Formation of Second Catalyst Region

In the present step, first, a catalyst layer forming slurry permeates from the exit side surface 16b of the partition wall 16 into the inside of the partition wall 16, and the catalyst layer forming slurry is deposited on the wall surface 18a of the pore 18. Specifically, the catalyst layer forming slurry is supplied into the exit side cell 14 of the base material 11, and suction is performed from the entry side cell 12. In the present step, the region into which the slurry is caused to permeate is controlled so as to prevent the slurry from permeating to the entry side surface 16a of the partition wall 16. Incidentally, the permeation of the slurry in the present step is influenced by a large number of conditions such as the amount of the slurry supplied, the viscosity of the slurry, the particle diameter of the component (a composite particle, an additive, or the like) of the slurry, the porosity of the partition wall of the base material, the pressure during suction, and the suction time. For this reason, preferably, a preliminary test obtained by appropriately changing the conditions is performed, and the region into which the slurry is caused to permeate is controlled based on the findings obtained in the test. Incidentally, the slurry for use in the present step may be the same as the slurry used for the formation of the first catalyst region 22, or may be a different slurry.

Then, in the present step, a drying step and a burning step are performed. As a result of this, a second catalyst region 24 is formed in the region into which the catalyst layer forming slurry has been caused to permeate. Then, the region into which the catalyst layer forming slurry has not been caused to permeate becomes a catalyst unformed region 30 in which the catalyst layer 20 is substantially not formed (the wall surface 18a of the pore 18 is exposed). Incidentally, the burning temperature in the present step is preferably 400° C. or more, more preferably 500° C. or more, and further preferably 600° C. or more as in the case of the formation of the first catalyst region 22. Further, the burning time is also preferably about 2 to 4 hours. As a result of this, it is possible to remove the organic solid content left in the pore 18 with reliability.

As described up to this point, with the manufacturing method, it is possible to manufacture the exhaust gas purifying catalyst 10 in which the first catalyst region 22 is provided on the entry side surface 16a of the partition wall 16, the second catalyst region 24 is provided in a prescribed region from the exit side surface 16b of the partition wall 16 toward the entry side cell 12, and the catalyst unformed region 30 is provided between the first catalyst region 22 and the second catalyst region 24.

Incidentally, the foregoing manufacturing method is one example of the means for manufacturing the exhaust gas purifying catalyst 10 in accordance with the present embodiment, and is not intended to limit the exhaust gas purifying catalyst herein disclosed. Namely, the method for manufacturing the exhaust gas purifying catalyst 10 including the first catalyst region 22, the second catalyst region 24, and the catalyst unformed region 30 is not limited to the foregoing method. For example, with the foregoing method, the formation of the first catalyst region 22 and removal of the organic solid content are performed by the burning treatment, and then, a slurry for forming the second catalyst region 24 is given. However, before performing the removal of the organic solid content by the burning treatment, the slurry for forming the second catalyst region 24 may be given. In this case, by performing a burning treatment subsequently, it is possible to perform the "formation of the first catalyst region 22", the "removal of the organic solid content", and the "formation of the second catalyst region 24" at the same time. For this reason, the manufacturing efficiency can be improved. Further, when the first catalyst region 22 can be formed without causing the slurry to permeate into the partition wall, it is also possible to manufacture the exhaust gas purifying catalyst herein disclosed without filling the resin solid content into the pore 18. As one example, the first catalyst region 22 can be formed without causing the slurry to permeate into the partition wall by the adjustment of various conditions such as the viscosity of the slurry, the particle diameter of the composite particle, the porosity of the partition wall, the pressure during suction, and the suction time, filling/giving of a prescribed component in place of the organic solid content, and the like.

<Other Aspects of Exhaust Gas Purifying Catalyst>

Incidentally, the exhaust gas purifying catalyst herein disclosed is not limited to the embodiment. For example, in the embodiment, the laminate structure including the first catalyst region 22, the catalyst unformed region 30, and the second catalyst region 24 stacked in this order is provided in the entire region of the partition wall 16 in the extension direction X. However, the laminate structure characterized by the technology herein disclosed may only be provided in a prescribed region on the upstream side of the extension direction of the partition wall, and is not limited to the foregoing embodiment. Specifically, with a general exhaust gas purifying catalyst, an exhaust gas with a high PM content tends to be supplied to the upstream side of the extension direction, and the PM content in the exhaust gas tends to be reduced with approach to the downstream side. For this reason, when the laminate structure is provided in the region on the upstream side in the extension direction of the partition wall, it is possible to establish the compatibility between the noxious gas purifying performance and the pressure loss suppressing performance at a sufficiently high level. At this step, the region including the laminate structure provided therein is preferably the region of 40% or more of the full length of the base material from the end on the exhaust gas inflow side of the base material, more preferably the region of 50% or more, further preferably the region of 60% or more, and in particular preferably the region of 70% or more. Incidentally, in the remaining part, a catalyst region including the catalyst layer formed in the entire region in the thickness direction may be provided, or the catalyst layer unformed region may be provided.

Test Example

Below, Test Example regarding the present invention will be described. It is not intended that the present invention is limited to those shown in such Test Example.

1. Manufacturing of Test Sample

Example

First, as a base material, a cylindrical honeycomb base material with a base material volume of 1.7 L, and a length of 152.4 mm (manufactured by Cordierite, number of cells 300 cpsi, partition wall thickness 8 mm, average pore diameter 20 and porosity 60%) was prepared.

Then, a pore filling slurry including a resin bead with an average particle diameter of 1 μm (polyethylene) dispersed in ion exchanged water was prepared. Then, the pore filling slurry was supplied into the entry side cell of the honeycomb base material, followed by suction of the exit side cell, thereby to be caused to permeate into the pore of the partition wall. Then, a dry treatment (100° C., 30 minutes) was carried out, resulting in a honeycomb base material in which the resin beads were filled in the pore of the partition wall.

Then, a rhodium nitrate solution (Rh content: 0.2 g), and a powder (40 g) of needle-shaped $Al_2O_3$ ($\gamma$-$Al_2O_3$) as a carrier were mixed with a proper amount of ion exchanged water, and the mixed solution was dried, followed by burning (500° C., 1 hour), resulting in a composite particle carrying a catalyst thereof (a Rh carrying-$Al_2O_3$ powder). Then, such a Rh carrying-$Al_2O_3$ powder and an OSC material (ceria-zirconia composite oxide) were mixed in ratios of 1:1, thereby preparing a catalyst layer forming slurry. Then, 200 ml of the catalyst layer forming slurry was supplied into the entry side cell of the honeycomb base material, followed by suction of the exit side cell, thereby giving the catalyst layer forming slurry to the entry side surface of the partition wall. Then, a dry treatment (100° C., 30 minutes) and a burning treatment (600° C., 120 minutes) were carried out, thereby burning out the resin bead, and forming a catalyst layer.

Then, 200 ml of the catalyst layer forming slurry was supplied into the exit side cell of the honeycomb base material, followed by suction of the entry side cell, thereby causing the slurry to permeate from the exit side surface of the partition wall toward the entry side cell. Then, a dry treatment (100° C., 30 minutes) and a burning treatment (500° C., 60 minutes) were carried out, thereby forming a catalyst layer on the wall surface of the pore in the inside of the partition wall.

Comparative Example

In Comparative Example, a catalyst layer forming slurry was supplied into the entry side cell, followed by suction of the exit side cell, thereby causing the slurry to permeate from the entry side surface of the partition wall toward the exit side cell. Then, a dry treatment (100° C., 30 minutes) and a burning treatment (500° C., 60 minutes) were carried out, thereby forming a catalyst layer on the wall surface of the pore in the inside of the partition wall. Incidentally, in Comparative Example, the same base material and catalyst layer forming slurry as those of Example were used. Further, the catalyst layer forming slurry supplied from the entry side cell in Comparative Example was in the same amount as the total amount (400 ml) of the slurry used in Example.

2. Evaluation Test (1) Observation of Catalyst Region

Figure 5:
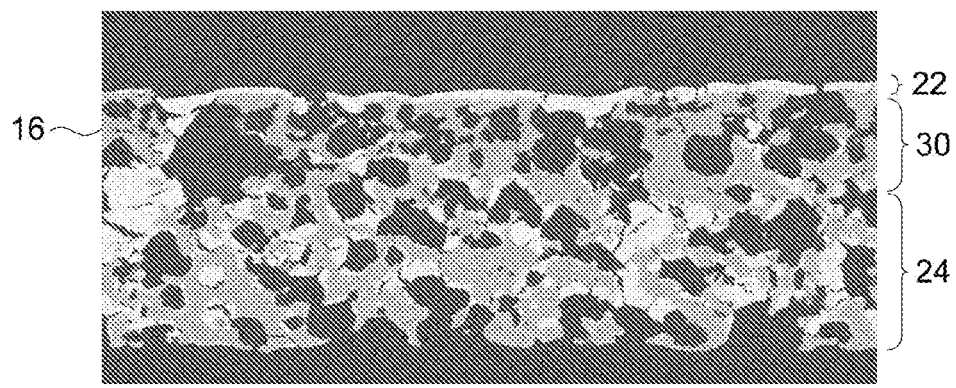
FIG. 5 is a cross-sectional SEM photograph of the cross section of a partition wall of a base material in an exhaust gas purifying catalyst of Example photographed at a magnification of 200 times.
Figure 6:
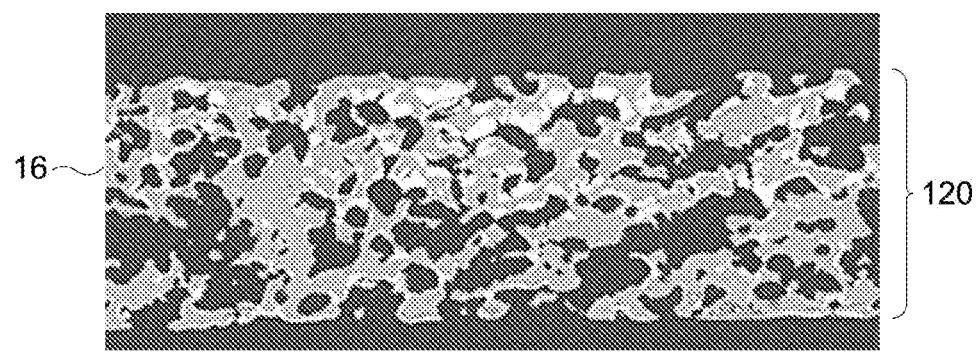
FIG. 6 is a cross-sectional SEM photograph of the cross section of a partition wall of a base material in an exhaust gas purifying catalyst of Comparative Example photographed at a magnification of 200 times.

The partition wall of the base material was cut out from the exhaust gas purifying catalyst of each Example described above, and 10 specimens in each of which the partition wall was embedded with a resin were prepared. Then, the cross section of the partition wall was cut out from each specimen, resulting in a SEM observation image (backscattered electron image, observation magnification: 200 times) of the cross section. Then, the cross section SEM observation image was subjected to automatic binarization processing (discriminant analysis method), resulting in a binary format image extracting the skeleton and the catalyst layer of the partition wall. One example of the cross section SEM observation image photographed in Example is shown in FIG. 5, and one example of the cross section SEM observation image photographed in Comparative Example is shown in FIG. 6.

Then, each Example was subjected to determination according to the "4. Determination procedure of each region", thereby determining whether the first catalyst region, the second catalyst region, and the catalyst unformed region were formed on the partition wall of the exhaust gas purifying catalyst to be inspected, or not. As a result, in Example, the specimens in each of which the first catalyst region 22, the second catalyst region 24, and the catalyst layer unformed region 30 were observed (see FIG. 5) accounted for 70% of the total specimens. For this reason, it was determined that in Example, the first catalyst region 22, the second catalyst region 24, and the catalyst layer unformed region 30 were provided on the partition wall 16 of the base material. On the other hand, in Comparative Example, only the specimen in which the catalyst layer 120 was formed from the entry side surface of the partition wall 116 toward the exit side cell (see FIG. 6) was observed.

(2) Measurement of Pressure Loss

The exhaust gas purifying catalyst of each Example was set in a soot generating device (DPG, manufactured by Cambustion), and a light oil was burnt, thereby supplying a gas including soot to the exhaust gas purifying catalyst. Then, the pressure in the laying pipe on the upstream side of the exhaust gas purifying catalyst, and the pressure in the laying pipe on the downstream side were measured, thereby calculating the pressure loss (kPa) based on these. Incidentally, in the present test, the pressure loss immediately after start of the test was referred to as the "initial pressure loss", and the pressure loss when the amount of PMs deposited in the catalyst became 1 g/L was referred to as the "PM deposition pressure loss". The measurement results of the initial pressure loss are shown in FIG. 7, and the measurement results of the PM deposition pressure loss are shown in FIG. 8.

Further, in the present test, simultaneously with the measurement of the pressure loss, the "PM collection rate" was also measured. Specifically, the number (count) of PM particles exhausted on the downstream side of the exhaust gas purifying catalyst when the PM deposition amount became 0.02 g/L was measured. Thus, the ratio thereof with respect to the number of PM particles exhausted immediately under the soot generating device was calculated as the PM collection rate (%). The results are shown in FIG. 9.

Figure 7:
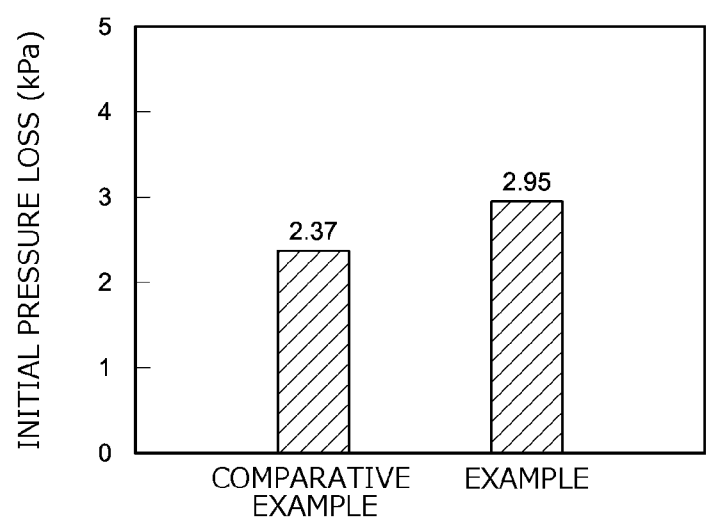
FIG. 7 is a graph showing the measurement results of the initial pressure loss (kPa) in Test Example.
Figure 8:
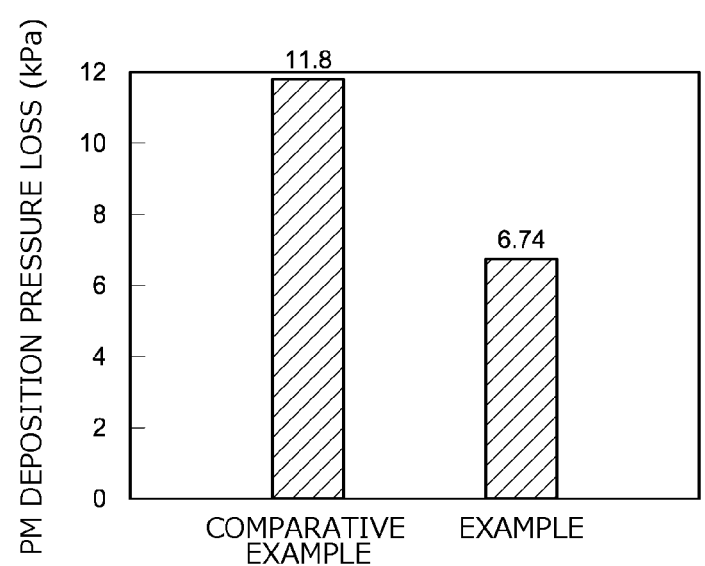
FIG. 8 is a graph showing the measurement results of the PM deposition pressure loss (kPa) in Test Example.

As shown in FIG. 7, comparison between respective Examples indicates that the initial pressure loss of Example was higher than that of Comparative Example. This is understood due to the fact that, in Example, the opening on the entry side surface side of the pore is covered with the catalyst layer (first catalyst region). However, for the PM deposition pressure loss measured when the PM deposition amount became 1 g/L (see FIG. 8), the pressure loss of Comparative Example sharply increases, and the pressure loss value is reversed between Example and Comparative Example. The results are presumed due to the fact that, in Comparative Example, PMs are deposited in the inside of the pore of the partition wall, resulting in blockage of the pore. On the other hand, it is understood that, in Example, most of PMs are collected in the first catalyst region and the catalyst layer unformed region, and PMs were scarcely deposited in the second catalyst region, and hence, an increase in pressure loss due to the blockage of the pore was not caused.

Figure 9:
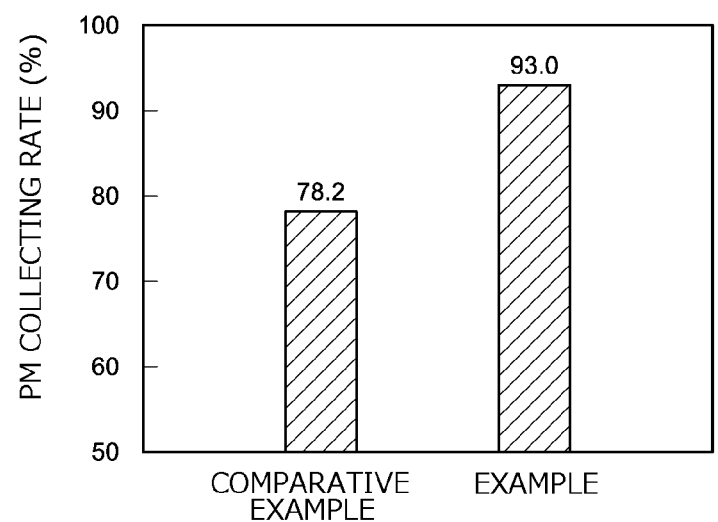
FIG. 9 is a graph showing the measurement results of the PM collection rate (%) in Test Example.

Further, as shown in FIG. 9, the exhaust gas purifying catalyst of Example shows a higher PM collection rate than that of Comparative Example. The result is presumed due to the following fact: in the exhaust gas purifying catalyst of Example, the PMs collected in the first catalyst region remain in the entry side cell, and hence the space for collecting PMs is sufficiently ensured.

(3) Measurement of T50 Catalyst Activity

Figure 10:
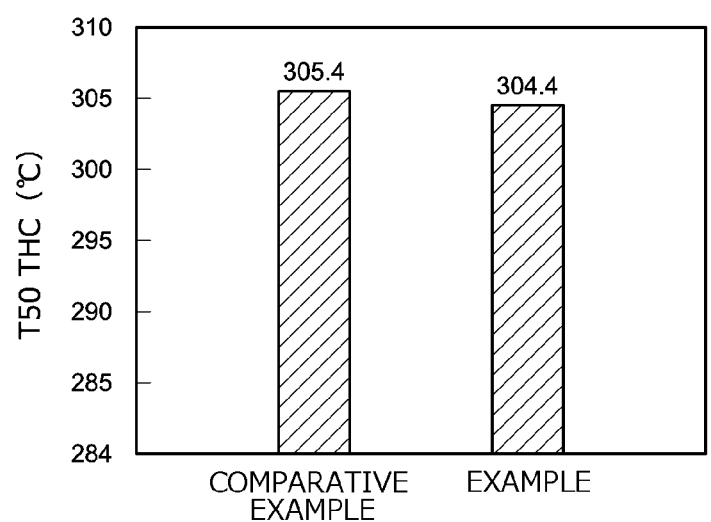
FIG. 10 is a graph showing the measurement results of the T50 catalyst activity (° C.) in Test Example.

The exhaust gas purifying catalyst of each Example was set in the exhaust system of an engine bench. Thus, while increasing the temperature from 50° C. at a heating rate of 50° C./min, the exhaust gas was supplied, and the noxious gas concentration in each of the laying pipe on the upstream side of the exhaust gas purifying catalyst and the laying pipe on the downstream side thereof was measured. Then, the exhaust gas temperature when the noxious gas concentration measured at the laying pipe on the downstream side became 50 mol % or less of the noxious gas concentration measured at the laying pipe on the upstream side was evaluated as the T50 catalyst activity (° C.). The results are shown in FIG. 10. The lower the temperature of the T50 catalyst activity, the lower the temperature at which the noxious gas component can be purified. For this reason, it can be said that the noxious gas purifying performance is excellent. Incidentally, with the present evaluation, three concentrations of CO, HC, and $NO_x$ are measured as the noxious gas concentrations. The temperature when all the concentrations of the three kinds of noxious gases became 50 mol % or less is evaluated as the T50 catalyst activity (° C.).

As shown in FIG. 10, it has been confirmed that the exhaust gas purifying catalyst of Example has a lower-temperature T50 catalyst activity than that of Comparative Example, and has an excellent noxious gas purifying performance. The result is presumed due to the following fact: for the exhaust gas purifying catalyst of Example, PMs are prevented from being deposited in the second catalyst region; for this reason, the contact frequency between the catalyst layer and the exhaust gas is sufficiently ensured.

(4) Summary of Evaluation Test

The evaluation tests described up to this point has confirmed that the exhaust gas purifying catalyst including the first catalyst region provided on the entry side surface of the partition wall, the second catalyst region provided in the inside of the partition wall from the exit side surface of the partition wall toward the entry side cell, and the catalyst layer unformed region provided between the first catalyst region and the second catalyst region exhibits the noxious gas purifying performance, the pressure loss suppressing performance, and the PM collecting performance at a high level.

Up to this point, specific examples of the present invention were described in details. However, these are merely examples, and do not restrict the scope of the appended claims. The technology described in the appended claims includes various modifications and changes of the specific examples described up to this point.

INDUSTRIAL APPLICABILITY

The present invention can provide a wall flow type exhaust gas purifying catalyst which has established the compatibility between the noxious gas purifying performance and the pressure loss suppressing performance at a high level. Such an exhaust gas purifying catalyst can preferably purify the exhaust gas exhausted from the internal combustion engine without reducing the performances of the internal combustion engine such as an automotive engine.

The invention claimed is:

1. An exhaust gas purifying catalyst comprising:
   a wall-flow-type base material and
   a catalyst layer formed on the base material,
   the base material including:
      an entry-side cell that is opened only at an end on an exhaust-gas inflow side,
      an exit-side cell that is opened only at an end on an exhaust-gas outflow side, and
      a partition wall for separating the entry-side cell and the exit-side cell, the partition wall including a plurality of pores for establishing communication between the entry-side cell and the exit-side cell,
   wherein a first catalyst-region, including the catalyst layer formed therein, is provided on a surface of the partition wall that is in contact with the entry-side cell,
   wherein a second catalyst-region, including the catalyst layer formed on a wall surface of the pores, is provided in a prescribed region from a surface of the partition wall that is in contact with the exit-side cell toward the entry-side cell, and
   wherein a catalyst unformed region, in which the catalyst layer is substantially not formed therein, is provided between the first catalyst-region and the second catalyst-region in a thickness direction of the partition wall.

2. The exhaust gas purifying catalyst according to claim 1, wherein a full length of the base material extends from an end on the exhaust gas inflow side between an end on the exhaust gas outflow side of the base material, wherein there exists a region of the full length of the base material, wherein the extent of the region of the full length of the base material is 50% or more of the full length of the base material, wherein the first catalyst-region, the second catalyst region, and the catalyst unformed region are all provided in the region of the full length of the base material.

3. The exhaust gas purifying catalyst according to claim 2, wherein a dimension of the first catalyst region in the thickness direction of the partition wall is 3 μm or more and 50 μm or less.

4. The exhaust gas purifying catalyst according to claim 2, wherein a dimension of the catalyst unformed region in the thickness direction of the partition wall is 10 μm or more and 100 μm or less.

5. The exhaust gas purifying catalyst according to claim 2, wherein the catalyst layer includes: a three-way catalyst for oxidizing CO and HC and reducing NOx; and a carrier for carrying the three-way catalyst thereon.

6. The exhaust gas purifying catalyst according to claim 2, wherein an amount of the catalyst layer formed per a volume of 1 L of the base material is 20 g/L or more and 180 g/L or less.

7. The exhaust gas purifying catalyst according to claim 1, wherein a dimension of the first catalyst region in the thickness direction of the partition wall is 3 μm or more and 50 μm or less.

8. The exhaust gas purifying catalyst according to claim 1, wherein a dimension of the catalyst unformed region in the thickness direction of the partition wall is 10 μm or more and 100 μm or less.

9. The exhaust gas purifying catalyst according to claim 1, wherein the catalyst layer includes: a three-way catalyst for oxidizing CO and HC and reducing NOx and a carrier for carrying the three-way catalyst thereon.

10. The exhaust gas purifying catalyst according to claim 9, wherein the three-way catalyst includes an element from the group consisting of Pt, Pd, and Rh.

11. The exhaust gas purifying catalyst according to claim 10, wherein a content of the three-way catalyst per a volume of 1 L of the base material is 0.1 g/L or more and 7 g/L or less.

12. The exhaust gas purifying catalyst according to claim 10, wherein the carrier includes at least one of alumina, ceria, zirconia, silica, and titania.

13. The exhaust gas purifying catalyst according to claim 10, wherein the catalyst layer includes an OSC material having an oxygen occluding ability.

14. The exhaust gas purifying catalyst according to claim 10, wherein the catalyst layer includes at least one or two or more of any of; an oxide, a sulfuric acid salt, a carbonic acid salt, a nitric acid salt, and a chloride of an alkaline-earth metal, a rare-earth metal, an alkali metal, and a transition metal.

15. The exhaust gas purifying catalyst according to claim 9, wherein a content of the three-way catalyst per a volume of 1 L of the base material is 0.1 g/L or more and 7 g/L or less.

16. The exhaust gas purifying catalyst according to claim 9, wherein the carrier includes at least one of alumina, ceria, zirconia, silica, and titania.

17. The exhaust gas purifying catalyst according to claim 9, wherein the catalyst layer includes an OSC material having an oxygen occluding ability.

18. The exhaust gas purifying catalyst according to claim 17, wherein the OSC material is a ceria-zirconia composite oxide.

19. The exhaust gas purifying catalyst according to claim 9, wherein the catalyst layer includes at least one of: an oxide, a sulfuric acid salt, a carbonic acid salt, a nitric acid salt, and a chloride of an alkaline-earth metal, a rare-earth metal, an alkali metal, and a transition metal.

20. The exhaust gas purifying catalyst according to claim 1, wherein an amount of the catalyst layer formed per a volume of 1 L of the base material is 20 g/L or more and 180 g/L or less.

* * * * *